Figure 1:
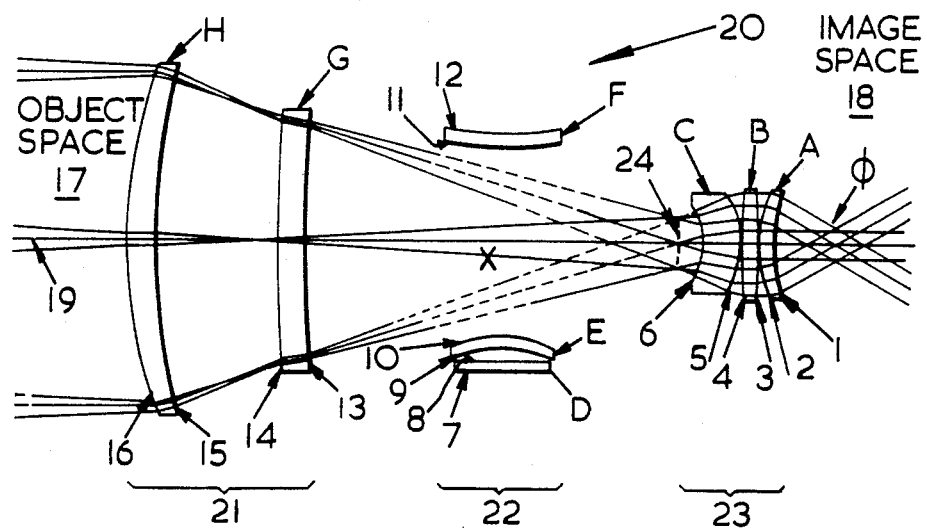
Figure 1:
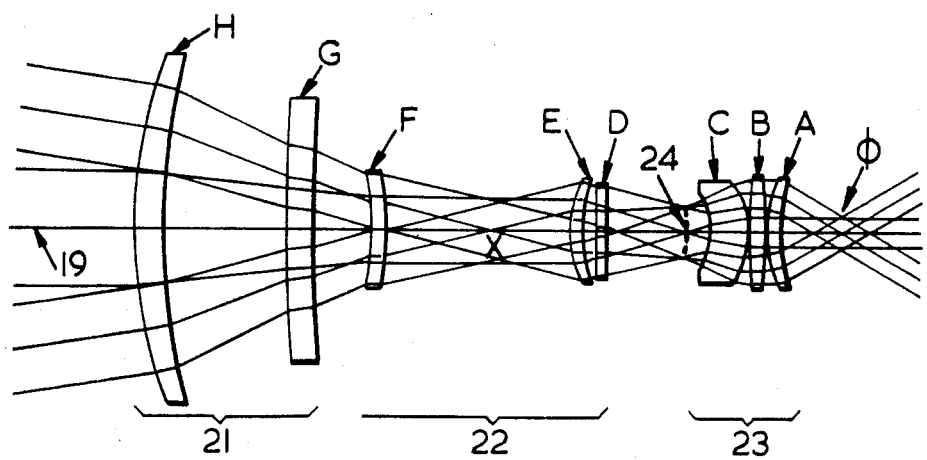

United States Patent [19]

Neil et al.

[11] Patent Number: 4,486,069
[45] Date of Patent: Dec. 4, 1984

[54] AFOCAL TELESCOPES

[75] Inventors: Iain A. Neil; Michael O. Lidwell; William McCreath, all of Glasgow, Scotland

[73] Assignee: Barr & Stroud Limited, Glasgow, Scotland

[21] Appl. No.: 391,586

[22] Filed: Jun. 23, 1982

[30] Foreign Application Priority Data

Jul. 1, 1981 [GB] United Kingdom ............... 8120274

[51] Int. Cl.$^3$ ............................................. G02B 15/14
[52] U.S. Cl. ..................................... 350/1.2; 350/1.4
[58] Field of Search ................ 350/1.2, 1.3, 453, 410, 350/1.4, 559

[56] References Cited

U.S. PATENT DOCUMENTS

| | | | |
|---|---|---|---|
| 1,553,211 | 9/1925 | Barr et al. | 350/559 |
| 3,622,218 | 11/1971 | Kruger | 350/1.4 |
| 4,383,727 | 5/1983 | Rogers | 350/1.3 |

FOREIGN PATENT DOCUMENTS 0654926  3/1979  U.S.S.R. ................ 350/410

*Primary Examiner*—John K. Corbin
*Assistant Examiner*—P. M. Dzierzynski
*Attorney, Agent, or Firm*—Mason, Fenwick & Lawrence

[57] ABSTRACT

An afocal telescope (20) comprises an objective system (21) and an eyepiece system (23) aligned on a common optical axis (19), the objective system (21) forming a real image (24) of radiation received from object space (17) and eyepiece system (23) being arranged to provide a magnified view of the object space scene at a pupil φ in image space (18). The eyepiece system (23) is formed by a triplet of lens elements A,B,C of which A and B are positively powered and C is negatively powered. Element C has a concave refractive surface (6) adjacent image (24) and a convex refractive surface (5) which is separated from the adjoining refractive surface (4) of element B by an air space which, in the axial direction, is substantially zero on the axis (19) and which progressively increases in magnitude as the distance off axis increases. The six refractive surfaces (1–6) of the eyepiece system (23) are free from aspherics and refractive surface (1) which is adjacent the pupil (5) is coated with an antireflection coating to avoid narcissus effect. Elements A, B and C may be made of germanium for use in the 8–14 micron waveband or of silicon for use in the 3–5 micron waveband.

13 Claims, 2 Drawing Figures

AFOCAL TELESCOPES

This invention relates to afocal telescopes.

The arrival of high performance forward looking infrared systems (commonly known by the acronym FLIR) has led to a demand for high performance afocal telescopes suitable for use with the FLIR system. Various forms of such telescopes have been previously proposed but the practical requirement for compactness (i.e. short, overall length) and a wide field of view in the image space of the telescope (i.e. scanner space) have imposed a requirement for low field and pupil aberrations.

To achieve this a high performance telescope system comprising an eyepiece lens producing low field and pupil aberrations and complementary objective lenses is required.

According to the present invention there is provided an afocal telescope comprising an objective system and an eyepiece system having a common optical axis, the objective system being arranged to accept radiation in the infrared waveband from a distant scene and to form a real image thereof within the telescope the eyepiece system being arranged to receive radiation from said image and to provide at a real pupil a magnified view of the scene, wherein said eyepiece system is formed by a triplet of three powered lens elements two of which are positively powered, the eyepiece lens element adjacent the objective system being negatively powered and having a concave refractive surface towards the objective system and a convex refractive surface remote from the objective system, said convex surface being separated from the adjoining refractive surface of the central lens element of the triplet by an air space which in the axial direction is substantially zero on said axis and which progressively increases in magnitude as the distance off axis increases.

Preferably the eyepiece lens elements are free of aspheric refractive surfaces so that it is optically and mechanically simple; with four refractive surfaces substantially spherical and two refractive surfaces substantially spherical or planar the lens elements are easy to manufacture; and the telescope can be arranged with its real image lying on or near the eyepiece refractive surface which is situated furthest from the exit pupil which can be advantageous. By providing the central eyepiece lens element with a biconvex configuration and with all lens element centre thicknesses being small, transmission is maximised and lens element material used is minimised. Because the eyepiece system can be designed with low field and pupil aberrations it can be attached to a variety of objective systems, either refractive or reflective, to provide a compact high performance afocal telescope.

Any one or more of the eyepiece lens elements may be provided with aspheric refractive surfaces in order to improve pupil control still further and with the possible effect of minimising oversize of the objective system, however, such improvements are of little significance and are obtained at the considerable increase in cost of manufacturing aspheric surfaces even where, as in the present case, these can be of high deviation and low tolerance.

All three eyepiece system lens elements may be made of germanium which has a refractive index of 4.003 and a V-value of 1182 and has a useful spectral bandpass in the 8–13 micron wavelength region. Alternatively all three lens elements may be made of silicon which has a refractive index of 3.425 and a V-value of 524 and has a useful spectral bandpass in the 3–5 micron infrared wavelength region. Preferably all three lens elements are made of the same material and of a material which possesses a high refractive index and V-value. However to vary the balance and degree of correction of field aberrations, it is possible to vary the choice of optical materials used for the three eyepiece lens elements.

The centre thickness of the eyepiece lens element nearest the real image is preferably large but not such as to render that lens element positive in power and its radii of curvature can be varied in conjunction with all lens element radii of curvature in a manner whereby there is provided a different field of view in scanner space.

The middle or central eyepiece lens element which is positive in power may take one of five bend forms these being meniscus with the concave surface facing towards or away from the real image, planoconvex with the plane surface nearest or furthest from the real image and biconvex. When used with each of the forms of middle lens element the eyepiece system provides a slightly different balance and degree of correction of field and pupil aberrations. In particular when used with the biconvex form of middle lens element the eyepiece system may require less optical material (i.e. bends of lens elements are small and accumulation of lens element centre thicknesses is small) therefore the eyepiece system has low cost and high transmission while maintaining low field and pupil aberrations.

The eyepiece lens element which is furthest from the objective system may also take one of the same five bend forms as described for the central eyepiece lens element but in the event that the refractive surface adjacent the output pupil in image space is planar or near planar it is preferable that it be coated with an antireflective coating such as that marketed by Barr and Stroud Limited under the designation ARG3, the characteristics of which are high transmission, average over 7.5–11.5 $\mu m \geq 98\%$ at 20° C. and low reflectivity, average over 8.0–11.5 $\mu m \leq 0.2\%$ at 20° C.; of course each surface of the three eyepiece lens elements may be similarly coated to obviate or mitigate unwanted reflections.

The two airspaces between the three eyepiece lens elements may be varied but to achieve compactness the two airspaces are made so small as is acceptable for manufacture and this is why the eyepiece system is referred to as a 'triplet'. Also, the distance of the real image from the nearest lens element may be reduced such that wholly or in part the real image lies near to or upon the concave surface of that lens element. The real image wholly or in part may lie within the nearest lens element of the eyepiece system.

One feature of the eyepiece system is that it may be optimised to suit one particular objective system and then without changing the eyepiece system wholly or in part the objective system may be changed in a manner whereby the paraxial magnification and focus of the telescope remains nearly constant. This can be particularly useful when the choice of objective system materials may be varied due to factors such as cost, risk or performance variations. Also, the eyepiece system and a complementary objective system such as a two element achromatic telephoto objective lens system may be optimised to provide near diffraction limited optical performance over the whole field of view, the clear aperture diameter of the primary objective lens element being only slightly greater than that required by the axial field pencil and the airspace between the objective system and the eyepiece system being ample to permit insertion of other lens groups, therefore providing the telescope with a multiple field of view capability. It is worth noting that the multiple field of view capability can be achieved by the insertion of an additional lens group and without disturbing the original single field of view lens elements. This allows accurate axial alignment in the original field of view optics.

Typically the eyepiece system may provide diffraction limited imagery at an exit pupil in scanner space. The exit pupil may have either a small diameter and a large field of view or a large diameter and a small field of view, e.g. 11 mm diameter, 72° field of view; or 15 mm diameter, 46° field of view. Also, the eyepiece system may be scaled to accommodate different pupil diameters but constant field.

There are a variety of objective lens systems with which the eyepiece system can be used to give different types of telescope of which the following are examples:

(a) High and low magnification achromatised and non-achromatised infrared telescopes.
(b) Dual, triple and multiple field of view infrared telescopes where the different fields of view are produced by the insertion, removal or substitution of lens groups.
(c) Continuous zoom infrared telescopes.
(d) Composite infrared telescopes containing at least two telescopes one of which may be as described in (b) and (c).
(e) Any of the aforedescribed systems (a), (b), (c) and (d) wherein any number of reflective or refractive surfaces have any surface form e.g. plane, spherical, aspherical, toric, etc.

Figure 2:
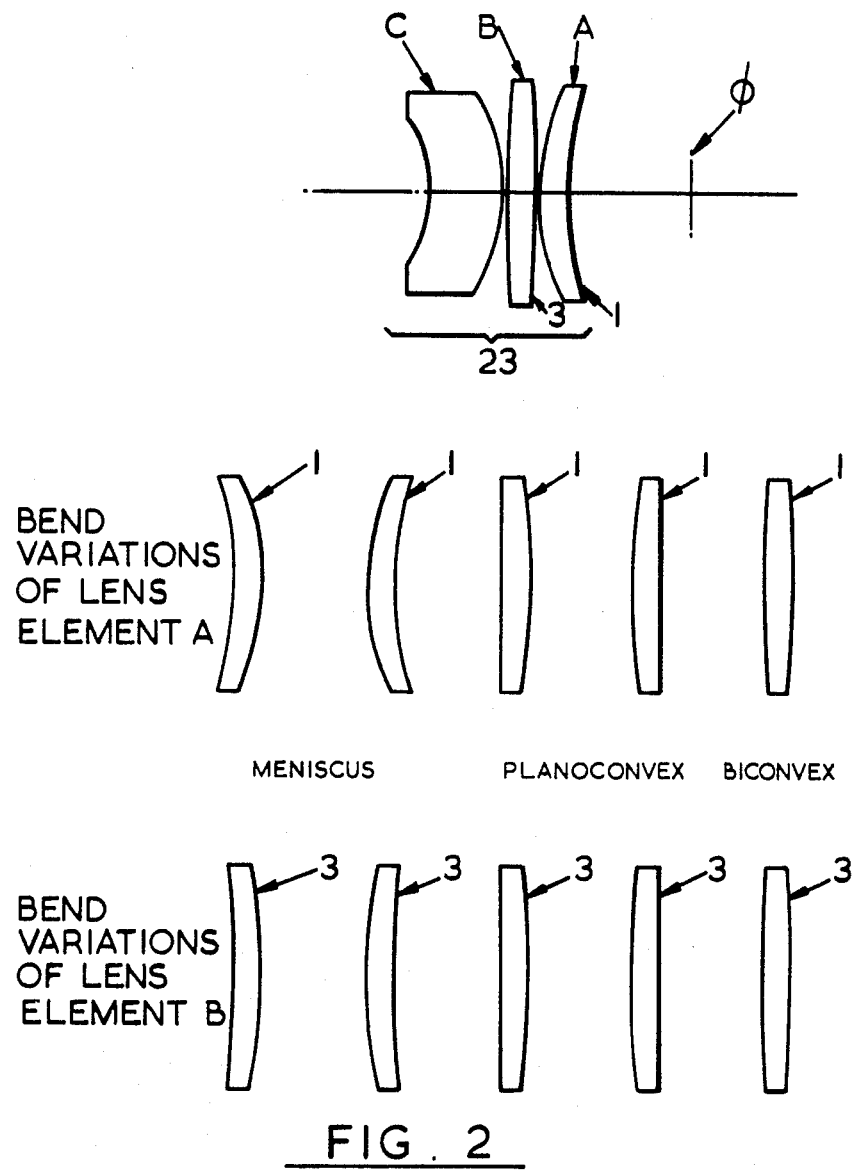

Embodiments of the present invention will now be described by way of example with reference to the accompanying schematic drawings and tables, in which:

FIG. 1 schematically illustrates a dual field afocal telescope, the two magnification modes being shown separately in the interests of clarity;

FIG. 2 illustrates the eyepiece system of the FIG. 1 telescope together with the permitted variations in bend shapes of the lens elements thereof.

As is shown in FIG. 1 a dual field of view refractor telescope 20 is formed by a high magnification objective system 21 and an eyepiece system 23 aligned on a common optical axis 19. A low magnification objective system 22 is arranged in such a way that it can be aligned on the common optical axis 19 between the high magnification objective system 21 and the eyepiece system 23. The telescope 20 is of the afocal refractor type and in either position of the low magnification system 22 the telescope forms a real image 24 from radiation entering the telescope from object space 17. The high magnification objective system 21 is mild telephoto and is formed by a primary lens element H and a secondary lens element G, the latter being negatively powered (i.e. divergent) and colour corrective, whereas the former (H) is positively powered (i.e. convergent). Element G has refractive surfaces 13,14 and element H has refractive surfaces 15, 16. The low magnification system 22 is formed by three lens elements D,E,F of which the elements D and F are negatively powered with respective refractive surfaces 7,8 and 11, 12 and the element E is positively powered with refractive surfaces 9,10. The eyepiece system 23 is formed by three lens elements A,B,C of which the elements A and B are positively powered with respective refractive surfaces 1,2 and 3,4 and the element C is negatively powered with refractive surfaces 5 and 6. Elements A, B and C together form a fixed focus system, elements D,E and F together form a fixed focus system and elements G and H together form a fixed focus system so that the high magnification objective system 21 either accepts bundles of rays from a large diameter entrance pupil formed in the object space 17 and internally forms an inverted real image 24 when the low magnification system 22 is inoperative or, when the low magnification system 22 is operative, accepts bundles of rays which originate in the object space 17 and which form a small diameter entrance pupil internal to the telescope (i.e. virtual pupil) which the low magnification system 22 collects and internally forms inverted real image 24. The two real images 24 are identical except for small differences of optical aberrations, and the two output ray bundles are collected by the eyepiece system 23 which provides bundles of parallel rays to form an exit pupil $\phi$ in image space 18, the bundles of parallel rays in image space 18 being identical except for small differences of optical aberrations. The optical power of and the spacing between the various lens elements A,B,C,D,E,F,G,H are arranged such that in the high magnification mode the image 24 lies between refractive surfaces 5 and 13 and in the low magnification mode the image 24 lies between refractive surfaces 5 and 7.

The refractive surfaces 1–6 and 8–16 are substantially spherical, i.e. if they are not truly spherical they are 'spherical' within the meaning of the art, whereas surface 7 has a flat or planar profile.

The telescope 20 is designed for use in the infrared wavelength region (i.e. 3–13 microns) and consequently the refractive indices of the lens elements are relatively large but in order to provide sufficiently high optical performance lens element G is colour corrective, negatively powered and has a lower refractive index than element H. This is achieved for the 8–13 micron range by making lens elements A,B,C,D,E,F and H of germanium, the refractive index of which is 4.00322, and lens element G of Barr & Stroud Type 1 chalcogenide glass, the refractive index of which is 2.49158, measured at a wavelength of 10 microns and at a temperature of 20° C. In this case element G has a dispersive capacity, or V-value, of 152, where the V-Value is defined as the ratio of the refractive index at 10.0 microns minus 1 to the refractive index at 8.5 microns minus the refractive index at 11.5 microns. These materials which are suited to being anti-reflection coated, when anti-reflection coated provide a telescope with at least 65% transmission, in both magnification modes, of incident radiation in the 8.5–11.5 micron range.

The lens element G is preferably movable along the optical axis 19 whereas the other lens elements A,B,C,D,E,F and H are not and this permits compensation of the telescope against movements in the position of the image 24, induced by ambient temperature changes typically within the range −10° C. to +50° C. Furthermore, for a fixed position of the image 24 the telescope can be focussed on distant objects, typically within the ranges 100 meters to infinity for the high magnification mode and 25 meters to infinity for the low magnification mode by movement of element G.

One example of the telescope 20 is detailed in Tables I and II wherein the radius of curvature of each refractive surface is given together with the aperture diameter of each surface and of the pupil $\phi$, the position of which is used as a datum from which the separation of successive refractive surfaces is defined, together with the nature of the material relevant to such separation interval. Thus, for example, surface 15 has a radius of curvature of −269.04 millimeters, the −ve sign indicating that the centre of curvature is to the right hand side of surface 15; it is separated by an air space of 47.29 millimeters from the preceding surface, No. 14, in the direction of the pupil $\phi$; it has an aperture diameter of 127.69 millimeters; and is separated from the succeeding surface No. 16, by a distance 11.35 millimeters in germanium. Table I details the telescope 20 when it is in the high magnification mode and Table II details the telescope 20 when it is in the low magnification mode. It will be seen that the sum of all the separations in Table I equals the sum of all the separations in Table II. The approximate coordinates of the rotation point X are 132.06 millimeters from the pupil $\phi$ along the optical axis 19 (to the left) and 6.00 millimeters perpendicular to the optical axis (downwards).

This telescope produces a high magnification of X11.5 and a low magnification of X4.0, and when in the high magnification mode has an internal f-number of 1.33 in the airspace between the lens elements G and H. Colour correction is maintained over the 8.5 to 11.5 micron range and with element G movable focussing is available in the high magnification mode over the range 100 meters to infinity and in the low magnification mode over the range 25 meters to infinity and thermal compensation is available in both modes of magnification over the range −10° C.−+50° C. with minimal degradation in overall performance. For practical purposes if the performance degradation is acceptable, the range for focus in the high and low modes of magnification can be increased to 40 meters to infinity and 10 meters to infinity respectively and in both modes of magnification the range for thermal compensation can be increased to −40° C.−+70° C. Specific values of image quality for this telescope are given in Tables III and IV, the former providing data relevant to the high magnification mode when focussed at a distance of approximately 1000 meters and the latter providing data relevant to the low magnification mode when focussed at a distance of approximately 550 meters.

The telescope which has been described when in the high magnification mode provides high performance over the full field with a primary objective aperture diameter enlarged by only 4.0% to accommodate pupil aberrations and when in the low magnification mode provides high performance over at least nine-tenths of the full field. For the high and low magnification modes the telescope produces angular distortion at the maximum field angle of about 0.2% and −9.1% respectively, the +ve sign indicating increasing magnification with increasing field angle and the −ve sign indicating decreasing magnification with increasing field angle.

As is shown in FIG. 1 the high magnification objective system 21 has the lens elements G and H permanently aligned on the optical axis 19 whereas the low magnification system 22 can be removed from alignment with the optical axis 19 into an inoperative position using a carousel type mechanism which rotates the low magnification system 22 about the point X. Because the telescope is compact with an internal f-number for the high magnification mode of less than 2.0 in the airspace between lens elements G and H and because the field of view in image space 18 is rectangular the largest field being in the horizontal, the smallest being in the vertical, the low magnification system 22 is most easily rotated in the vertical plane. This has the advantage of reducing the maximum field angle of the ray bundles and the clear aperture of the lens element F which eases the space constraints. It will be noted that the low magnification system 22 when aligned on the optical axis 19 lies between the high magnification objective system 21 and the eyepiece system 23 therefore the configuration of the three lens systems 21, 22 and 23 permits the use of simple mechanics. Also the telescope 20 either can operate as a single field of view system simply by the complete removal of the low magnification system 22 or can operate as a triple or multiple field of view system simply by the introduction of additional lens systems of which these may or may not be similar in optical and mechanical, configuration and construction, to the low magnification system 22.

A second example of the telescope 20 is detailed in Tables V–VIII wherein Table V details the telescope 20 when it is in the high magnification mode and Table VI details the telescope 20 when it is in the low magnification mode. It will be seen that the sum of all the separations in Table V equals the sum of all the separations in Tables VI, I and II. Also, it will be seen that the low magnification system 22 in Tables II and VI is identical, the eyepiece system 23 in Tables I, II, V and VI is identical and the position of the rotation point X is identical.

The high magnification objective system 21 has been changed but only in part, the secondary element G', which is made of germanium, has different radii of curvature for refractive surfaces 13' and 14', the centre thickness as measured between refractive surfaces 13' and 14' will be seen as reduced and the air space as measured between refractive surfaces 14' and 15' will be seen as increased.

This telescope is similar in other respects to that of the telescope detailed in Tables I–IV, such as the high and low magnifications, thermal and focus aspects, objective aperture oversize due to pupil aberrations and the control of field aberrations. Because this telescope does not use a colour correcting material in the high magnification objective system the telescope is not achromatised and because the telescope is also compact the resolution performance is degraded particularly in the high magnification mode. Specific values of image quality for this telescope are given in Tables VII and VIII, the former providing data relevant to the high magnification mode when focussed at a distance of approximately 555 meters and the latter providing data relevant to the low magnification mode when focussed at a distance of approximately 172 meters.

A third example of the telescope 20 is detailed in Tables IX–XII wherein Table IX details the telescope 20 when it is in the high magnification mode and Table X details the telescope when it is in the low magnification mode. The high magnification system 21 and the low magnification system are identical to those detailed in Tables I and II whereas the eyepiece system 23 and the separation between the eyepiece system 23 and both the high magnification system 21 and the low magnification system 22 are different. This telescope produces a high magnification of X8.6 and a low magnification of X2.9, and when in the high magnification mode has an internal f-number of 1.28 in the airspace between lens elements G and H. This telescope is similar in thermal and focus aspects to that of the telescope detailed in Tables I-IV and the eyepiece system accommodates a pupil diameter of 15 mm and a field of view of 46.4° (diagonal)×38.1° (horizontal)×26.5° (vertical). Specific values of image quality for this telescope are given in Tables XI and XII, the former providing data relevant to the high magnification mode and the latter providing data relevant to the low magnification mode, both modes being at a focus of approximately infinity. Because this telescope, in both magnification modes, accepts about 17% less field of view in object space compared to the telescope detailed in Tables I and II and maintains an almost equal primary objective aperture diameter and, excepting separation 1, similar overall length, the resolution performance is degraded primarily by undercorrected spherical aberration. The telescope when in the high magnification mode provides reasonable performance over the full field with a primary objective aperture diameter enlarged by less than 0.8% to accommodate pupil aberrations and when in the low magnification mode provides acceptable performance over at least nine-tenths of the full field. For the high and low magnification modes the telescope produces angular distortion at the maximum field angle of about −0.3% and −7.6% respectively, the sign convention being as hereinabove described.

A fourth example of the telescope 20 is detailed in Tables XIII-XVI wherein Table XIII details the telescope 20 when it is in the high magnification mode and Table XIV details the telescope 20 when it is in the low magnification mode. The high magnification system 21 and the low magnification system 22 are identical to those detailed in Tables V and VI whereas the eyepiece system 23 and the separation between the eyepiece system 23 and both the high magnification system 21 and the low magnification system 22 are different. The eyepiece system 23 is identical to that detailed in Tables IX and X and it will be seen that the sum of all the separations in Table XIII equals the sum of all the separations in each of Tables XIV, IX and X.

This telescope is similar in other respects to that of the telescope detailed in Tables IX-XII, such as the high and low magnifications, thermal and focus aspects, objective aperture oversize due to pupil aberrations and the control of field aberrations. Because this telescope does not use a colour correcting material in the high magnification objective system the telescope is not achromatised and because the telescope is also compact the resolution performance is degraded particularly in the high magnification mode. Specific values of image quality for this telescope are given in Tables XV and XVI, the former providing data relevent to the high magnification mode and the latter providing data relevant to the low magnification mode, both modes being at a focus of approximately infinity.

The telescopes detailed in Tables IX-XVI do not provide as high resolution performance as that for the telescopes detailed in Tables I-VIII, but low pupil and field aberrations are produced. The two eyepiece systems which, excepting small changes in separation, are interchangeable and provide a change of pupil diameter and field of view in image space therefore allowing attachment to the telescope in image space of two different optical instruments, the telescope having unchanged high and low magnification systems of which the high magnification system has the useful feature of interchangeability of one lens element.

In the infrared waveband (i.e. 1-13 microns) where optical materials are expensive, quality and quantity variable a telescope which has the useful feature of the interchangeability of lens elements is particularly attractive. For the first two examples of telescope described herein the interchangeability of one lens element has been shown in an extreme case, wherein one telescope is achromatised and the other telescope is non-achromatised. Table XVII lists some of the other optical materials from which a more suitable change of optical material may be chosen for element G.

The eyepiece system 23 which has been described provides low field and pupil abberrations thus providing a telescope with minimal objective aperture oversize and good imaging performance across the field of view. In addition the eyepiece system 23 enables the lens elements in the objective system to be configured in such a way that a variety of single, dual and mutiple field of view telescopes can be designed. Furthermore, the eyepiece system 23 permits the objective system of the telescope to have one or more interchangeable lens elements.

As is shown in FIG. 2 the lens elements A and B of the eyepiece system 23 may each take a variety of bend shapes while each of the lens elements A and B is maintained with positive power and lens element C is maintained with negative power. However, it is to be noted that each configuration produces variations of field and pupil aberrations, quantity of optical material used through bending and changes in lens element centre thicknesses, distortion, narcissus effect and other minor aspects.

Although the embodiments describe only an eyepiece system used in a dual magnification afocal telescope which operates in the 8-13 micron wavelength region, the eyepiece system 23 may be used with other objective lens systems such as multiconfiguration and zoom systems of which these may operate over the 8-13 micron wavelength region, the 3-5 micron wavelength region, the 3-13 micron wavelength region and even over the 1-13 micron wavelength region. Also, a variety of lens materials can be used to construct the lens elements of the eyepiece system. For all surface configurations the eyepiece system (when using high efficiency anti-reflection coatings) can be combined with a FLIR system without introducing any noticeable narcissus effect. It is to be noted that Tables I to IX (inclusive) are for 20° C., and the f-number specified herein is derived from the formula $(2 \sin \theta)^{-1}$, where $\theta$ is the half angle of the cone formed by the axial field pencil after refraction from the lens element on which the pencil is incident.

TABLE I

| Lens | Surface | Separation | Radius of curvature | Material | Aperture* Diameter |
|---|---|---|---|---|---|
| Entrance Pupil* | 0 | 0 | Flat | Air | 11.00 |
| A | 1 | 23.86 | −70.13 | Air | 37.34 |
|  | 2 | 5.25 | −47.97 | Ge | 39.73 |
| B | 3 | 1.00 | 344.97 | Air | 40.19 |
|  | 4 | 5.00 | −482.88 | Ge | 39.92 |
| C | 5 | 1.00 | 35.65 | Air | 36.44 |
|  | 6 | 13.95 | 24.97 | Ge | 24.20 |
| G | 13 | 152.11 | −610.07 | Air | 94.21 |
|  | 14 | 9.00 | −1432.15 | As/Se/Ge/(BSI) | 97.48 |
| H | 15 | 47.29 | −269.04 | Air | 127.69 |
|  | 16 | 11.35 | −184.85 | Ge | 131.52 |

*Maximum field angle at entrance pupil = 60°
*As required by this magnification mode.

TABLE II

| Lens | Surface | Separation | Radius of Curvature | Material | Aperture[x] Diameter |
|---|---|---|---|---|---|
| Entrance Pupil* | ∅ | 0 | Flat | Air | 11.0 |
| A | 1 | 23.86 | −70.13 | Air | 37.34 |
|  | 2 | 5.25 | −47.97 | Ge | 39.73 |
| B | 3 | 1.00 | 344.97 | Air | 40.19 |
|  | 4 | 5.00 | −482.88 | Ge | 39.92 |
| C | 5 | 1.00 | 35.65 | Air | 36.44 |
|  | 6 | 13.95 | 24.97 | Ge | 24.20 |
| D | 7 | 40.00 | Flat | Air | 34.22 |
|  | 8 | 3.50 | 594.41 | Ge | 34.68 |
| E | 9 | 5.25 | −61.88 | Air | 36.30 |
|  | 10 | 4.80 | −41.62 | Ge | 38.15 |
| F | 11 | 71.313 | 179.52 | Air | 42.45 |
|  | 12 | 4.75 | 121.31 | Ge | 42.08 |
| G | 13 | 22.50 | −610.07 | Air | 59.66 |
|  | 14 | 9.00 | −1432.15 | As/Se/Ge(BSI) | 63.32 |
| H | 15 | 47.29 | −269.04 | Air | 105.39 |
|  | 16 | 11.35 | −184.85 | Ge | 109.80 |

*Maximum field angle at entrance pupil = 60°.
[x]As required by this magnification mode.

TABLE III

Approximate R.M.S. Spot Sizes in Object Space (in milliradians)

| Field (Maximum = 60°) | Monochromatic at 10.0 microns | *Chromatic over 8.5–11.5 microns |
|---|---|---|
| Axial | 0.049 | 0.062 |
| ½ | 0.051 | 0.074 |
| ¾ | 0.047 | 0.076 |
| Full | 0.061 | 0.091 |

*Given as an equally weighted three wavelength accumulated measurement, the wavelengths being 8.5, 10.0 and 11.5 microns.

TABLE IV

Approximate R.M.S. Spot Sizes in Object Space (in milliradians)

| Field (Maximum = 60°) | Monochromatic at 10.0 microns | *Chromatic over 8.5–11.5 microns |
|---|---|---|
| Axial | 0.062 | 0.111 |
| ½ | 0.415 | 0.449 |
| ¾ | 0.457 | 0.492 |
| Full | 0.602 | 0.630 |

*Given as an equally weighted three wavelength accumulated measurement, the wavelengths being 8.5, 10.0 and 11.5 microns.

TABLE V

| Lens | Surface | Separation | Radius of Curvature | Material | Aperture[x] Diameter |
|---|---|---|---|---|---|
| Entrance Pupil* | ∅ | 0 | Flat | Air | 11.00 |
| A | 1 | 23.86 | −70.13 | Air | 37.34 |
|  | 2 | 5.25 | −47.97 | Ge | 39.73 |
| B | 3 | 1.00 | 344.97 | Air | 40.19 |
|  | 4 | 5.00 | −482.88 | Ge | 39.92 |
| C | 5 | 1.00 | 35.65 | Air | 36.44 |
|  | 6 | 13.95 | 24.97 | Ge | 24.20 |
| G' | 13' | 152.11 | −1108.90 | Air | 94.69 |
|  | 14' | 7.50 | −2232.29 | Ge | 96.36 |
| H | 15' | 48.79 | −269.04 | Air | 127.41 |
|  | 16 | 11.35 | −184.85 | Ge | 131.24 |

*Maximum field angle at entrance pupil = 60°.
[x]As required by this magnification mode.

TABLE VI

| Lens | Surface | Separation | Radius of Curvature | Material | Aperture[x] Diameter |
|---|---|---|---|---|---|
| Entrance Pupil* | ∅ | 0 | Flat | Air | 11.00 |
| A | 1 | 23.86 | −70.13 | Air | 37.34 |
|  | 2 | 5.25 | −47.97 | Ge | 39.73 |
| B | 3 | 1.00 | 344.97 | Air | 40.19 |
|  | 4 | 5.00 | −482.88 | Ge | 39.92 |
| C | 5 | 1.00 | 35.65 | Air | 36.44 |
|  | 6 | 13.95 | 24.97 | Ge | 24.20 |
| D | 7 | 40.00 | Flat | Air | 34.22 |
|  | 8 | 3.50 | 594.41 | Ge | 34.68 |
| E | 9 | 5.25 | −61.88 | Air | 36.30 |
|  | 10 | 4.80 | −41.62 | Ge | 38.15 |
| F | 11 | 71.313 | 179.52 | Air | 42.45 |
|  | 12 | 4.75 | 121.31 | Ge | 42.08 |
| G' | 13' | 22.50 | −1108.90 | Air | 59.94 |
|  | 14' | 7.50 | −2232.29 | Ge | 61.82 |
| H | 15' | 48.79 | −269.04 | Air | 105.19 |
|  | 16 | 11.35 | −184.85 | Ge | 109.60 |

*Maximum field angle at entrance pupil = 60°.
[x]As required by this magnification mode.

TABLE VII

Approximate R.M.S. Spot Sizes in Object Space (in milliradians)

| Field (Maximum = 60°) | Monochromatic at 10.0 microns | *Chromatic over 8.5–11.5 microns |
|---|---|---|
| Axial | 0.054 | 0.168 |
| ½ | 0.077 | 0.195 |
| ¾ | 0.093 | 0.202 |
| Full | 0.113 | 0.214 |

*Given as an equally weighted three wavelength accumulated measurement, the wavelengths being 8.5, 10.0 and 11.5 microns.

TABLE VIII

Approximate R.M.S. Spot Sizes in Object Space (in milliradians)

| Field (Maximum = 60°) | Monochromatic at 10.0 microns | *Chromatic over 8.5–11.5 microns |
|---|---|---|
| Axial | 0.104 | 0.183 |
| ½ | 0.391 | 0.445 |
| ¾ | 0.417 | 0.478 |
| Full | 0.641 | 0.692 |

*Given as an equally weighted three wavelength accumulated measurement, the wavelengths being 8.5, 10.0 and 11.5 microns.

TABLE IX

| Lens | Surface | Separation | Radius of Curvature | Material | Aperture[x] Diameter |
|---|---|---|---|---|---|
| Entrance Pupil* | ∅ | 0 | Flat | Air | 15.00 |
| A | 1 | 33.46 | −60.72 | Air | 41.82 |
|  | 2 | 5.25 | −49.49 | Ge | 44.61 |
| B | 3 | 1.00 | 250.34 | Air | 45.27 |
|  | 4 | 4.75 | −2087.25 | Ge | 44.87 |
| C | 5 | 1.00 | 38.68 | Air | 41.09 |
|  | 6 | 14.70 | 27.57 | Ge | 27.81 |
| G | 13 | 156.23 | −610.07 | Air | 93.00 |
|  | 14 | 9.00 | −1432.15 | As/Se/Ge(BSI) | 96.22 |
| H | 15 | 47.29 | −269.04 | Air | 126.59 |
|  | 16 | 11.35 | −184.85 | Ge | 130.66 |

*Maximum field angle at entrance pupil = 46.4°.
[x]As required by this magnification mode.

TABLE X

| Lens | Surface | Separation | Radius of Curvature | Material | Aperture[x] Diameter |
|---|---|---|---|---|---|
| Entrance Pupil* | ∅ | ∅ | Flat | Air | 15.00 |
| A | 1 | 33.46 | −60.72 | Air | 41.82 |
|  | 2 | 5.25 | −49.49 | Ge | 44.61 |
| B | 3 | 1.00 | 250.34 | Air | 45.27 |
|  | 4 | 4.75 | −2087.25 | Ge | 44.87 |
| C | 5 | 1.00 | 38.68 | Air | 41.09 |
|  | 6 | 14.70 | 27.57 | Ge | 27.80 |
| D | 7 | 44.53 | Flat | Air | 35.06 |
|  | 8 | 3.50 | 594.41 | Ge | 35.53 |

TABLE X-continued

| Lens | Surface | Separation | Radius of Curvature | Material | Aperture$^X$ Diameter |
|---|---|---|---|---|---|
| E | 9 | 5.25 | −61.88 | Air | 37.08 |
|   | 10 | 4.80 | −41.62 | Ge | 38.92 |
| F | 11 | 71.31 | 179.52 | Air | 42.94 |
|   | 12 | 4.75 | 121.31 | Ge | 42.58 |
| G | 13 | 22.09 | −610.07 | Air | 60.27 |
|   | 14 | 9.00 | −1432.15 | As/Se/Ge(BSI) | 64.02 |
| H | 15 | 47.29 | −269.04 | Air | 107.19 |
|   | 16 | 11.35 | −184.85 | Ge | 111.64 |

*Maximum field angle at entrance pupil = 46.4°.
$^X$As required by this magnification mode.

TABLE XI

Appropriate R.M.S. Spot Sizes in Object Space (in milliradians)

| Field (Maximum = 46.4°) | Monochromatic at 10.00 microns | *Chromatic over 8.5–11.5 microns |
|---|---|---|
| Axial | 0.094 | 0.104 |
| ⅓ | 0.115 | 0.134 |
| ⅔ | 0.131 | 0.152 |
| Full | 0.154 | 0.175 |

*Given as an equally weighted three wavelength accumulated measurement, the wavelengths being 8.5, 10.0 and 11.5 microns.

TABLE XII

Approximate R.M.S. Spot Sizes in Object Space (in milliradians).

| Field (Maximum = 46.4°) | Monochromatic at 10.0 microns | *Chromatic over 8.5–11.5 microns |
|---|---|---|
| Axial | 0.439 | 0.450 |
| ⅓ | 0.698 | 0.741 |
| ⅔ | 0.740 | 0.782 |
| Full | 0.970 | 1.010 |

*Given as an equally weighted three wavelength accumulated measurement, the wavelengths being 8.5, 10.0 and 11.5 microns.

TABLE XIII

| Lens | Surface | Separation | Radius of Curvature | Material | Aperture$^X$ Diameter |
|---|---|---|---|---|---|
| Entrance* Pupil | ∅ | 0 | Flat | Air | 15.00 |
| A | 1 | 33.46 | −60.72 | Air | 41.82 |
|   | 2 | 5.25 | −49.49 | Ge | 44.61 |
| B | 3 | 1.00 | 250.34 | Air | 45.27 |
|   | 4 | 4.75 | −2087.25 | Ge | 44.87 |
| C | 5 | 1.00 | 38.68 | Air | 41.09 |
|   | 6 | 14.70 | 27.57 | Ge | 27.81 |
| G | 13 | 156.23 | −1108.90 | Air | 93.47 |
|   | 14 | 7.50 | −2232.29 | Ge | 95.11 |
| H | 15 | 48.79 | −269.04 | Air | 126.34 |
|   | 16 | 11.35 | −184.85 | Ge | 130.41 |

*Maximum field angle at entrance pupil = 46.4°.
$^X$As required by this magnification mode.

TABLE XIV

| Lens | Surface | Separation | Radius of Curvature | Material | Aperture$^X$ Diameter |
|---|---|---|---|---|---|
| Entrance* Pupil | ∅ | ∅ | Flat | Air | 15.00 |
| A | 1 | 33.46 | −60.72 | Air | 41.82 |
|   | 2 | 5.25 | −49.49 | Ge | 44.61 |
| B | 3 | 1.00 | 250.34 | Air | 45.27 |
|   | 4 | 4.75 | −2087.25 | Ge | 44.87 |
| C | 5 | 1.00 | 38.68 | Air | 41.09 |
|   | 6 | 14.70 | 27.57 | Ge | 27.80 |
| D | 7 | 44.53 | Flat | Air | 35.06 |
|   | 8 | 3.50 | 594.41 | Ge | 35.53 |
| E | 9 | 5.25 | −61.88 | Air | 37.08 |
|   | 10 | 4.80 | −41.62 | Ge | 38.92 |
| F | 11 | 71.31 | 179.52 | Air | 42.94 |
|   | 12 | 4.75 | 121.31 | Ge | 42.58 |
| G | 13 | 22.09 | −1108.90 | Air | 60.57 |
|   | 14 | 7.50 | −2232.29 | Ge | 62.49 |
| H | 15 | 48.79 | −269.04 | Air | 107.01 |
|   | 16 | 11.35 | −184.85 | Ge | 111.46 |

*Maximum field angle at entrance pupil = 46.4°.
$^X$As required by this magnification mode.

TABLE XV

Appropriate R.M.S. Spot Sizes in Object Space (in milliradians)

| Field (Maximum = 46.4°) | Monochromatic at 10.00 microns | *Chromatic over 8.5–11.5 microns |
|---|---|---|
| Axial | 0.097 | 0.203 |
| ⅓ | 0.116 | 0.232 |
| ⅔ | 0.136 | 0.244 |
| Full | 0.164 | 0.261 |

*Given as an equally weighted three wavelength accumulated measurement, the wavelengths being 8.5, 10.0 and 11.5 microns.

TABLE XVI

Approximate R.M.S. Spot Sizes in Object Space (in milliradians).

| Field (Maximum = 46.4°) | Monochromatic at 10.0 microns | *Chromatic over 8.5–11.5 microns |
|---|---|---|
| Axial | 0.439 | 0.478 |
| ⅓ | 0.683 | 0.741 |
| ⅔ | 0.715 | 0.778 |
| Full | 1.024 | 1.086 |

*Given as an equally weighted three wavelength accumulated measurement, the wavelengths being 8.5, 10.0 and 11.5 microns.

TABLE XVII

| Material | Refractive* index | V-value$^\#$ |
|---|---|---|
| BS2 | 2.856 | 248 |
| BSA | 2.779 | 209 |
| TI 1173 | 2.600 | 142 |
| AMTIR | 2.497 | 169 |
| BS 1 | 2.492 | 152 |
| TI 20 | 2.492 | 144 |
| KRS 5 | 2.370 | 260 |

*The refractive index is for 10.0 microns
$^\#$Over the wavelength range 8.5–11.5 microns

What is claimed is:

1. An afocal telescope comprising an objective system and an eyepiece system having a common optical axis, the objective system being arranged to accept radiation in the infrared waveband from a distant scene and to form a real image thereof within the telescope the eyepiece system being arranged to receive radiation from said image and to provide at a real pupil a magnified view of the scene, wherein said objective system has an f-number of the order of 2.5 or less and said eyepiece system is formed by a triplet of three powered lens elements each being made of a material having a refractive index of the order of 2.4 or greater and a dispersive V-value of the order of 140 or greater, two of said eyepiece lens elements being of high positive power, the eyepiece lens element adjacent the objective system being of very low power due to its thickness and having a concave refractive surface towards the objective system and a convex refractive surface remote from the objective system, said convex surface being separated from the adjoining refractive surface of the central lens element of the triplet by an air space which in the axial direction is substantially zero on said axis and which progressively increases in magnitude as the distance off axis increases.

2. A telescope as claimed in claim 1, wherein the six refractive surfaces of the eyepiece system are free from aspherics.

3. A telescope as claimed in claim 1, wherein of the six refractive surfaces of the eyepiece system at least that one which is proximal the real pupil is coated with an antireflection coating.

4. An afocal telescope as claimed in claim 1, wherein the lens elements of said eyepiece system have refractive surface curvatures, separation distances between refractive surfaces (RS) as measured successively from the refractive surface proximal to said pupil, and materials as set forth in the following table:

| Item | Surface | Separation Distance (mm) | Radius of Curvature (mm) | Material | Aperature Diameter |
|---|---|---|---|---|---|
| | | Eyepiece System | | | |
| 1st lens element | 1st RS | 23.86 | −70.13 | Air | 37.34 |
| | 2nd RS | 5.25 | −47.97 | Ge | 39.73 |
| 2nd lens element | 1st RS | 1.00 | 344.97 | Air | 40.19 |
| | 2nd RS | 5.00 | −482.88 | Ge | 39.92 |
| 3rd lens element | 1st RS | 1.00 | 35.65 | Air | 36.44 |
| | 2nd RS | 13.95 | 24.97 | Ge | 24.20 |

5. An afocal telescope as claimed in claim 1, wherein the lens elements of said eyepiece system have refractive surface curvatures, separation distances between refractive surfaces (RS) as measured successively from the refractive surface proximal to said pupil, and materials as set forth in the following table:

| Item | Surface | Separation Distance (mm) | Radius of Curvature (mm) | Material | Aperature Diameter |
|---|---|---|---|---|---|
| | | Eyepiece System | | | |
| 1st lens element | 1st RS | 33.46 | −60.72 | Air | 41.82 |
| | 2nd RS | 5.25 | −49.49 | Ge | 44.61 |
| 2nd lens element | 1st RS | 1.00 | 250.34 | Air | 45.27 |
| | 2nd RS | 4.75 | −2087.02 | Ge | 44.87 |
| 1st lens element | 1st RS | 1.00 | 38.68 | Air | 41.09 |
| | 2nd RS | 14.70 | 27.57 | Ge | 27.81 |

6. An afocal telescope as claimed in claim 1, wherein said objective system is formed by a primary lens element and a secondary lens element and the refractive surface curvatures, separation distances and materials of the telescope are as set forth in the following table, separation distances being measured successively from said pupil:

| Item | Surface | Separation Distance (mm) | Radius of Curvature (mm) | Material | Aperature Diameter |
|---|---|---|---|---|---|
| Pupil | — | 0 | Flat | Air | 11.00 |
| | | Eyepiece System | | | |
| 1st lens element | 1st RS | 23.86 | −70.13 | Air | 37.34 |
| | 2nd RS | 5.25 | −47.97 | Ge | 39.73 |
| 2nd lens element | 1st RS | 1.00 | 344.97 | Air | 40.19 |
| | 2nd RS | 5.00 | −482.88 | Ge | 39.92 |
| 3rd lens element | 1st RS | 1.00 | 35.65 | Air | 36.44 |
| | 2nd RS | 13.95 | 24.97 | Ge | 24.20 |
| | | Objective System | | | |
| Secondary lens element | 1st RS | 152.11 | −610.07 | Air | 94.21 |
| | 2nd RS | 9.00 | −1432.15 | (BSI) | 97.48 |
| Primary lens element | 1st RS | 47.29 | −269.04 | Air | 127.69 |
| | 2nd RS | 11.35 | −184.85 | Ge | 131.52 |

7. An afocal telescope as claimed in claim 1, wherein said objective system comprises a high magnification system formed by a primary lens element and a secondary lens element, and a low magnification system formed by first second and third lens elements of which the first is proximal said secondary lens element, and the refractive surface curvatures, separation distances and materials of the telescope are as set forth in the following table, separation distances being measured successively from said pupil:

| Item | Surface | Separation Distance (mm) | Radius of Curvature (mm) | Material | Aperature Diameter |
|---|---|---|---|---|---|
| Pupil | — | 0 | Flat | Air | 11.0 |
| | | Eyepiece System | | | |
| 1st lens element | 1st RS | 23.86 | −70.13 | Air | 37.34 |
| | 2nd RS | 5.25 | −47.97 | Ge | 39.73 |
| 2nd lens element | 1st RS | 1.00 | 344.97 | Air | 40.19 |
| | 2nd RS | 5.00 | −482.88 | Ge | 39.92 |
| 3rd lens element | 1st RS | 1.00 | 35.65 | Air | 36.44 |
| | 2nd RS | 13.95 | 24.97 | Ge | 24.20 |
| | | Objective System Low Magnification System | | | |
| 3rd lens element | 1st RS | 40.00 | Flat | Air | 34.22 |
| | 2nd RS | 3.50 | 594.41 | Ge | 34.68 |
| 2nd lens element | 1st RS | 5.25 | −61.88 | Air | 36.30 |
| | 2nd RS | 4.80 | −41.62 | Ge | 38.15 |
| 1st lens element | 1st RS | 71.313 | 179.52 | Air | 42.45 |
| | 2nd RS | 4.75 | 121.31 | Ge | 42.08 |
| | | Objective System High Magnification System | | | |
| Secondary lens element | 1st RS | 22.50 | −610.07 | Air | 59.66 |
| | 2nd RS | 9.00 | −1432.15 | (BSI) | 63.32 |
| Primary lens element | 1st RS | 47.29 | −269.04 | Air | 105.39 |
| | 2nd RS | 11.35 | −184.85 | Ge | 109.80 |

8. An afocal telescope as claimed in claim 1, wherein said objective system is formed by a primary lens element and a secondary lens element and the refractive surface curvatures, separation distances and materials of the telescope are as set forth in the following table, separation distances being measured successively from said pupil:

| Item | Surface | Separation Distance (mm) | Radius of Curvature (mm) | Material | Aperature Diameter |
|---|---|---|---|---|---|
| Pupil | — | 0 | Flat | Air | 11.00 |
| | | Eyepiece System | | | |
| 1st | 1st RS | 23.86 | −70.13 | Air | 37.34 |

-continued

| Item | Surface | Separation Distance (mm) | Radius of Curvature (mm) | Material | Aperture Diameter |
|---|---|---|---|---|---|
| lens element | 2nd RS | 5.25 | −47.97 | Ge | 39.73 |
| 2nd lens element | 1st RS | 1.00 | 344.97 | Air | 40.19 |
|  | 2nd RS | 5.00 | −482.88 | Ge | 39.92 |
| 3rd lens element | 1st RS | 1.00 | 35.65 | Air | 36.44 |
|  | 2nd RS | 13.95 | 24.97 | Ge | 24.20 |
| Objective System | | | | | |
| Secondary lens element | 1st RS | 152.11 | −1108.90 | Air | 94.67 |
|  | 2nd RS | 7.50 | −2232.29 | Ge | 96.36 |
| Primary lens element | 1st RS | 48.79 | −269.04 | Air | 127.41 |
|  | 2nd RS | 11.35 | −184.85 | Ge | 131.24 |

9. An afocal telescope as claimed in claim 1, wherein said objective system comprises a high magnification system formed by a primary lens element and a secondary lens element, and a low magnification system formed by first second and third lens elements of which the first is proximal said secondary lens element, and the refractive surface curvatures, separation distances and materials of the telescope are as set forth in the following table, separation distances being measured successively from said pupil:

| Item | Surface | Separation Distance (mm) | Radius of Curvature (mm) | Material | Aperture Diameter |
|---|---|---|---|---|---|
| Pupil | — | 0 | Flat | Air | 11.00 |
| Eyepiece System | | | | | |
| 1st lens element | 1st RS | 23.86 | −70.13 | Air | 37.34 |
|  | 2nd RS | 5.25 | −47.97 | Ge | 39.73 |
| 2nd lens element | 1st RS | 1.00 | 344.97 | Air | 40.19 |
|  | 2nd RS | 5.00 | −482.88 | Ge | 39.92 |
| 3rd lens element | 1st RS | 1.00 | 35.65 | Air | 36.44 |
|  | 2nd RS | 13.95 | 24.97 | Ge | 24.20 |
| Objective System | | | | | |
| Low Magnification System | | | | | |
| 3rd lens element | 1st RS | 40.00 | Flat | Air | 34.22 |
|  | 2nd RS | 3.50 | 594.41 | Ge | 34.68 |
| 2nd element | 1st RS | 5.25 | −61.88 | Air | 36.30 |
|  | 2nd RS | 4.80 | −41.62 | Ge | 38.15 |
| 1st lens element | 1st RS | 71.313 | 179.52 | Air | 42.45 |
|  | 2nd RS | 4.75 | 121.31 | Ge | 42.08 |
| Objective System | | | | | |
| High Magnification System | | | | | |
| Secondary lens element | 1st RS | 22.50 | −1108.90 | Air | 59.94 |
|  | 2nd RS | 7.50 | −2232.29 | Ge | 61.82 |
| Primary lens element | 1st RS | 48.79 | −269.04 | Air | 105.19 |
|  | 2nd RS | 11.35 | −184.85 | Ge | 109.60 |

10. An afocal telescope as claimed in claim 1, wherein said objective system is formed by a primary lens element and a secondary lens element and the refractive surface curvatures, separation distances and materials of the telescope are as set forth in the following table, separation distances being measured successively from said pupil:

| Item | Surface | Separation Distance (mm) | Radius of Curvature (mm) | Material | Aperture Diameter |
|---|---|---|---|---|---|
| Pupil | — | 0 | Flat | Air | 15.00 |
| Eyepiece System | | | | | |
| 1st lens element | 1st RS | 33.46 | −60.72 | Air | 41.82 |
|  | 2nd RS | 5.25 | −49.49 | Ge | 44.61 |
| 2nd lens element | 1st RS | 1.00 | 250.34 | Air | 45.27 |
|  | 2nd RS | 4.75 | −2087.25 | Ge | 44.87 |
| 3rd lens element | 1st RS | 1.00 | 38.68 | Air | 41.09 |
|  | 2nd RS | 14.70 | 27.57 | Ge | 27.81 |
| Objective System | | | | | |
| Secondary lens element | 1st RS | 156.23 | −610.07 | Air | 93.00 |
|  | 2nd RS | 9.00 | −1432.15 | (BSI) | 96.22 |
| Primary lens element | 1st RS | 47.29 | −269.04 | Air | 126.59 |
|  | 2nd RS | 11.35 | −184.85 | Ge | 130.66 |

11. An afocal telescope as claimed in claim 1, wherein said objective system comprises a high magnification system formed by a primary lens element and a secondary lens element, and a low magnification system formed by first second and third lens elements of which the first is proximal said secondary lens element, and the refractive surface curvatures, separation distances and materials of the telescope are as set forth in the following table, separation distances being measured successively from said pupil:

| Item | Surface | Separation Distance (mm) | Radius of Curvature (mm) | Material | Aperture Diameter |
|---|---|---|---|---|---|
| Pupil | — | 0 | Flat | Air | 15.00 |
| Eyepiece System | | | | | |
| 1st lens element | 1st RS | 33.46 | −60.72 | Air | 41.82 |
|  | 2nd RS | 5.25 | −49.49 | Ge | 44.61 |
| 2nd lens element | 1st RS | 1.00 | 250.34 | Air | 45.27 |
|  | 2nd RS | 4.75 | −2087.25 | Ge | 44.87 |
| 3rd lens element | 1st RS | 1.00 | 38.68 | Air | 41.09 |
|  | 2nd RS | 14.70 | 25.57 | Ge | 27.80 |
| Objective System | | | | | |
| Low Magnification System | | | | | |
| 3rd lens element | 1st RS | 44.53 | Flat | Air | 35.06 |
|  | 2nd RS | 3.50 | 594.41 | Ge | 35.53 |
| 2nd lens element | 1st RS | 5.25 | −61.88 | Air | 37.08 |
|  | 2nd RS | 4.80 | −41.62 | Ge | 38.92 |
| 1st lens element | 1st RS | 71.31 | 179.52 | Air | 42.94 |
|  | 2nd RS | 4.75 | 121.31 | Ge | 42.58 |
| Objective System | | | | | |
| High Magnification System | | | | | |
| Secondary lens element | 1st RS | 22.09 | −610.07 | Air | 60.27 |
|  | 2nd RS | 9.00 | −1432.15 | (BSI) | 64.02 |
| Primary lens element | 1st RS | 47.29 | −269.04 | Air | 107.19 |
|  | 2nd RS | 11.35 | −184.85 | Ge | 111.64 |

12. An afocal telescope as claimed in claim 1, wherein said objective system is formed by a primary lens element and a secondary lens element and the refractive surface curvatures, separation distances and materials of the telescope are as set forth in the following table, separation distances being measured successively from said pupil:

| Item | Surface | Separation Distance (mm) | Radius of Curvature (mm) | Material | Aperture Diameter |
|---|---|---|---|---|---|
| Pupil | — | 0 | Flat | Air | 15.00 |
| Eyepiece System | | | | | |
| 1st lens element | 1st RS | 33.46 | −60.72 | Air | 41.82 |
| | 2nd RS | 5.25 | −49.49 | Ge | 44.61 |
| 2nd lens element | 1st RS | 1.00 | 250.34 | Air | 45.27 |
| | 2nd RS | 4.75 | −2087.25 | Ge | 44.87 |
| 3rd lens element | 1st RS | 1.00 | 38.68 | Air | 41.09 |
| | 2nd RS | 14.70 | 27.57 | Ge | 27.81 |
| Objective System | | | | | |
| Secondary lens element | 1st RS | 156.23 | −1108.90 | Air | 93.47 |
| | 2nd RS | 7.50 | −2232.29 | Ge | 95.11 |
| Primary lens element | 1st RS | 48.79 | −269.04 | Air | 126.34 |
| | 2nd RS | 11.35 | −184.85 | Ge | 130.41 |

13. An afocal telescope as claimed in claim 1, wherein said objective system comprises a high magnification system formed by a primary lens element and a secondary lens element, and a low magnification system formed by first second and third lens elements of which the first is proximal said secondary lens element, and the refractive surface curvatures, separation distances and materials of the telescope are as set forth in the following table, separation distances being measured successively from said pupil:

| Item | Surface | Separation Distance (mm) | Radius of Curvature (mm) | Material | Aperture Diameter |
|---|---|---|---|---|---|
| Pupil | — | 0 | Flat | Air | 15.00 |
| Eyepiece System | | | | | |
| 1st lens element | 1st RS | 33.46 | −60.72 | Air | 41.82 |
| | 2nd RS | 5.25 | −49.49 | Ge | 44.61 |
| 2nd lens element | 1st RS | 1.00 | 250.34 | Air | 45.27 |
| | 2nd RS | 4.75 | −2087.25 | Ge | 44.87 |
| 3rd lens element | 1st RS | 1.00 | 38.68 | Air | 41.09 |
| | 2nd RS | 14.70 | 27.57 | Ge | 27.80 |
| Objective System Low Magnification System | | | | | |
| 3rd lens element | 1st RS | 44.53 | Flat | Air | 35.06 |
| | 2nd RS | 3.50 | 594.41 | Ge | 35.53 |
| 2nd lens element | 1st RS | 5.25 | −61.88 | Air | 37.08 |
| | 2nd RS | 4.80 | −41.62 | Ge | 38.92 |
| 1st lens element | 1st RS | 71.31 | 179.52 | Air | 42.94 |
| | 2nd RS | 4.75 | 121.31 | Ge | 42.58 |
| Objective System High Magnification System | | | | | |
| Secondary lens element | 1st RS | 22.09 | −1108.90 | Air | 60.57 |
| | 2nd RS | 7.50 | −2232.29 | Ge | 62.49 |
| Primary lens element | 1st RS | 48.79 | −269.04 | Air | 107.01 |
| | 2nd RS | 11.35 | −184.85 | Ge | 111.46 |

* * * * *